United States Patent [19]

Hsu

[11] Patent Number: 5,191,807
[45] Date of Patent: Mar. 9, 1993

[54] INDEXED GEAR-SHIFT MECHANISM

[76] Inventor: Yi-Hsung Hsu, No. 9, Lane 130, Sec. 1, Kwangfu Rd., Sanchung City, Taipei County, Taiwan

[21] Appl. No.: 802,126

[22] Filed: Dec. 3, 1991

[51] Int. Cl.[5] .......................................... B60K 20/00
[52] U.S. Cl. ..................................... 74/501.6; 74/475
[58] Field of Search ............... 74/142, 475, 489, 502.2

[56] References Cited

U.S. PATENT DOCUMENTS

| | | | |
|---|---|---|---|
| 4,864,885 | 9/1989 | Nagano | 74/475 X |
| 4,936,160 | 6/1990 | Barnard et al. | 74/489 X |
| 5,012,692 | 5/1991 | Nagano | 74/475 |
| 5,044,213 | 9/1991 | Nagano | 74/475 X |
| 5,094,120 | 3/1992 | Tagawa | 74/475 |

Primary Examiner—Rodney H. Bonck
Assistant Examiner—Nicholas Whitelaw
Attorney, Agent, or Firm—Peterson, Wicks, Nemer & Kamrath

[57] ABSTRACT

An indexed gear-shift mechanism for a bicycle that has one lever for up-shifting and another lever for down-shifting. A ratchet wheel is fixed to the down-shifting lever and has two rows of teeth along an outer curvature thereof. A pair of pawls are placed on the up-shifting lever and works in conjunction with the two rows of teeth. A pair of springs respectively apply force on the levers in a counterclockwise direction. When a rider applies a force on the up-shifting lever in a clockwise direction, the pawls move to a next adjacent pair of teeth, one pawl preventing rotation of the lever and the other pawls preventing rotation of the ratchet wheel; the bicycle is in a higher gear. When a rider applies a force on the down-shifting lever in a clockwise direction, the pawls move to a previous adjacent pair of teeth, but the pawls do not prohibit movement of the down-shifting lever; therefore, the ratchet wheel may be down-shifted through as many gears as desired in one action.

5 Claims, 3 Drawing Sheets

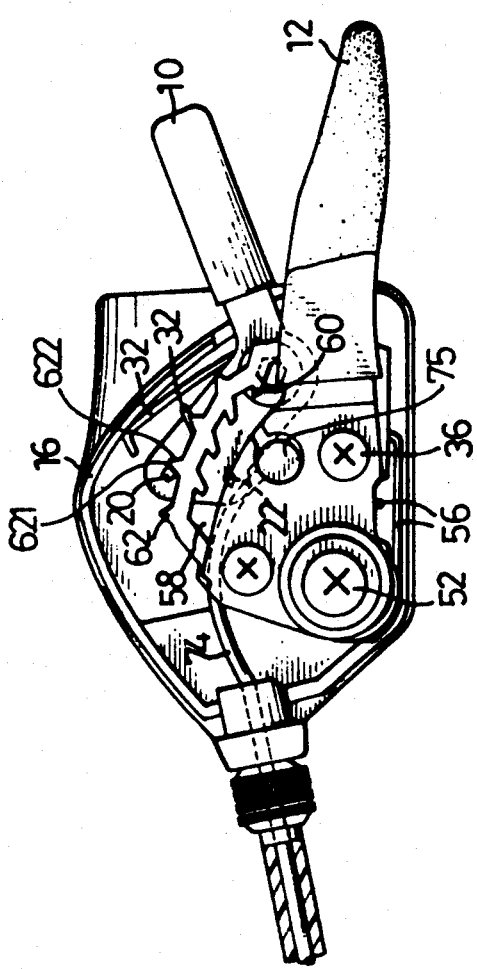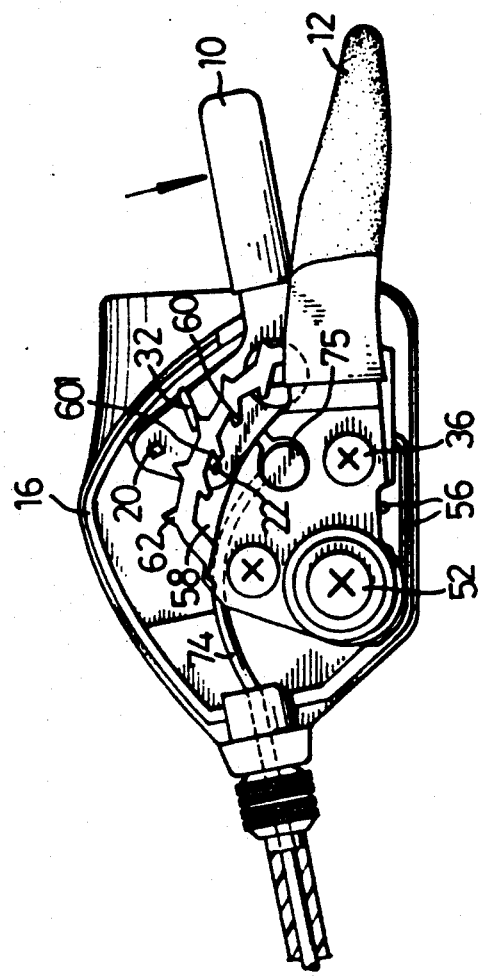
FIG. 2
FIG. 3

INDEXED GEAR-SHIFT MECHANISM

BACKGROUND OF THE INVENTION

Field of the Invention

The present invention relates to cable-orientated shifting mechanisms, particularly to an indexed gear-shift mechanism for a bicycle.

Description of Related Art

The specialization of bicycles today has created classifications of bicycles to be used in specific environments, such as mountain terrain bicycles and their urban equivalent, "city" bicycles. The number of gears for these bicycles usually ranges in multiples of five, six, or seven.

On conventional bicycles the gear-shift mechanisms are positioned on the post of the handlebars or on the down tube of the frame. To shift gears, the rider has to remove a hand from the handlebars to operate the gear-shift mechanism. This creates a possibly unsafe situation as mountain terrain bikes and city bikes are often rode over hilly terrain of an uneven or rugged surface. These types of bikes also require quick shifting, as the speed of a bicycle changes quickly on hilly terrain.

Indexed gear-shifts were introduced to minimize the time a rider had to have his hand removed from the handlebars on the gear-shift mechanism. Gear-shifts were also repositioned near the hand grips of the handlebars so as to allow the rider to always have control of the handlebars with both hands.

For conventional indexed gear-shift mechanisms, if the rider is in a high gear, it is required to shift through all of the intermediate gears to be in the lowest gear. This takes time and distracts the rider's attention. There are situations when this is desired, but it would also be desirable for an indexed gear-shift mechanism to allow a rider to shift from a high or highest gear to the lowest gear in a single action.

SUMMARY OF THE INVENTION

Accordingly, it is an object of the present invention to provide an indexed gear-shift mechanism for a bicycle which allows a rider to shift from a high or the highest gear to the lowest gear in a single action.

It is another object of the present invention to provide an indexed gear-shift mechanism with a pair of lever arms, one for up-shifting and one for down-shifting, where down-shifting is performed either one gear at a time or from a higher or the highest gear to the lowest gear in a single action.

Other objects and features of the present invention will become apparent to those skilled in the art upon reading the following detailed description thereof with appropriate reference to the accompanying drawings.

BRIEF DESCRIPTION OF THE DRAWINGS

FIG. 2 is a bottom plan view of an indexed gear shift mechanism in accordance with the present invention with a half of a housing thereof removed;

FIG. 3 is a view similar to FIG. 2 in which an arrow indicated a movement of an up-shifting lever.

DETAILED DESCRIPTION OF THE PREFERRED EMBODIMENTS

Construction

Figure 1:
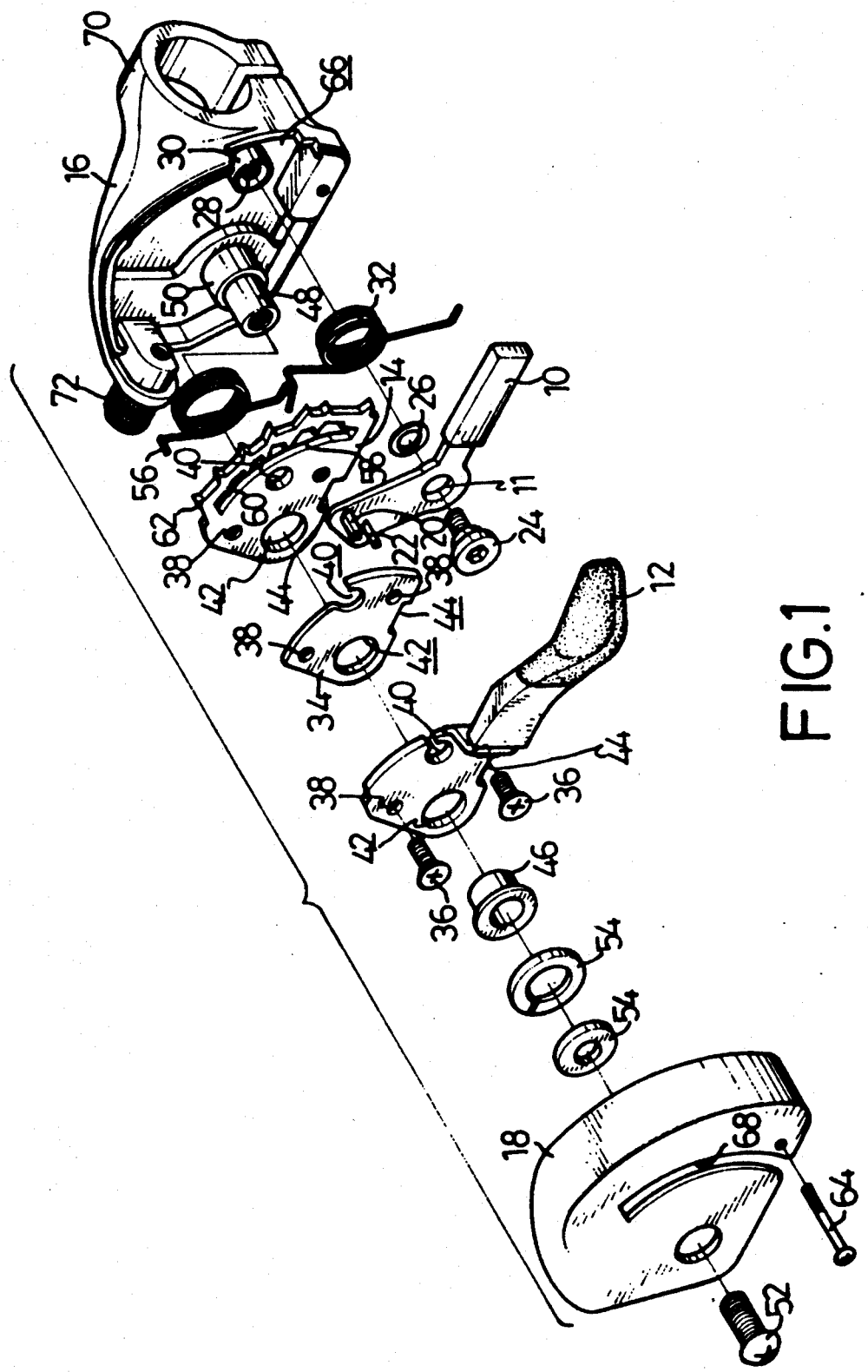
FIG. 1 is an exploded view of an indexed gear shift mechanism in accordance with the present invention.

Now referring to the drawings, initially to FIG. 1, an indexed gear-shift mechanism is shown in a preferred embodiment in accordance with the present invention and generally comprises an up-shifting lever 10, a down-shifting lever 12, and a ratchet plate 14 encased by a housing 17 (see FIG. 4) consisting of a base 16 and a cover 18.

The up-shifting lever 10 has an external handle portion and an internal mechanical portion obtusely offset with a through hole 11 at a vertex thereof. The internal portion has a pair of pawls, an outer 20 and an inner 22, protruding perpendicularly therefrom, which will be discussed later. The up-shifting lever 10 is pivotally attached to the base 16 by a respective fastening means, such as a collared bolt 24, a washer 26, and a receiving hole 28 formed in a boss 30 formed on the base 16. A first spring 32 is disposed around the boss 30 and urges the up-shifting lever 10 in a counterclockwise direction.

The down-shifting lever 12 has an external handle portion and an internal mechanical portion. A shim plate 34 is position between the down-shifting lever 12 and the ratchet plate 14, and all three are attached together by conventional fastening means such as screws 36 and holes 38, the latter in the ratchet plate 14 being threaded.

A receiving space 40 is formed in corresponding positions in each of the internal portion of the down-shifting lever 12, the shim plate 34, and the ratchet plate 14 for receiving a block 75 at an end of a gear-shift cable 74 (see FIGS. 2 and 3). The shim plate 34 has a smaller radius of curvature than those of the internal portion of the down-shifting lever 12 and the ratchet plate 14, such that the gear-shift cable rests on an upper surface thereof, retained between the larger two.

The above-described assembly has corresponding through holes 42 and corresponding notches 44 formed in the shim plate 34, the down shifting lever 12, and the ratchet plate 14. The through holes 42 receive a collared washer 46 therein which receives therein a first boss 48 mounted on a second boss 50 formed on the base 16, thereby pivotally attaching the above-described assembly to the base 16 with additional fastening means such as a screw 52 and washers 54.

A second spring 56 is disposed around the second boss 50 and has one end thereof received by the notches 44, thereby urging the down-shifting lever 12 and the ratchet plate 14 in a counterclockwise direction.

The ratchet plate 14 has a groove 58 formed therein. An inner row of teeth 60 projects inward from an outer wall of the groove 58, and an outer row of teeth 62 projects outward from the ratchet plate 14 along an outer curvature thereof. The number of teeth of the inner and the outer rows 60 and 62 depends on the desired number of gears, the preferred embodiment shown having seven gears. The operation of the rows of teeth will be discussed later.

When the cover 18 is attached to the base 16 by a screw 64 the external portion of the up-shifting lever 10 projects through a first slot 66 formed in the base 16 and the external portion of the down-shifting lever 12 project through a second slot 68 formed in the cover 18.

The base 16 further has a clamp 70 for mounting around the handlebars 2 adjacent to a hand grip 4 of a bicycle and a cable port 72 for guiding the gear-shift cable in and out of the base 16.

Operation

Now referring to FIG. 2, the gear-shift mechanism is shown in second gear (second to lowest), with the outer pawl 20 contacting a front side 621 of a second tooth in the outer row of teeth 62, thereby preventing counterclockwise rotation of the ratchet plate 14 and the downshifting lever 12 against the force of the second spring 56, such that a gear-shift cable 74 is prevented movement.

Now referring to FIG. 3, when a clockwise force is applied to the up-shifting lever 10 by a rider, the inner pawl 22 is drawn toward a tooth of the inner row of teeth 60 as the outer pawl 20 is drawn off the front side 621 of the second the tooth of the outer row of teeth 62. When the outer pawl 20 clears the tooth, the second spring 56 urges and rotates the ratchet plate 14 counterclockwise until a tooth of a front side 601 of the inner row of teeth 60 catches on the inner pawl 22, thereby retaining further movement. When the rider releases the up-shifting lever 10, the first spring 32 urges and rotates the up-shifting lever 10 counterclockwise, drawing the inner pawl 22 off of the tooth of the inner row of teeth 60, allowing the ratchet plate 14 to rotate counterclockwise, urging the gear-shift cable 74 outward, until the outer pawl 20 contacts with the front side of the next adjacent tooth of the outer row of teeth 62. The above describes an up-shifting procedure.

Figure 4:
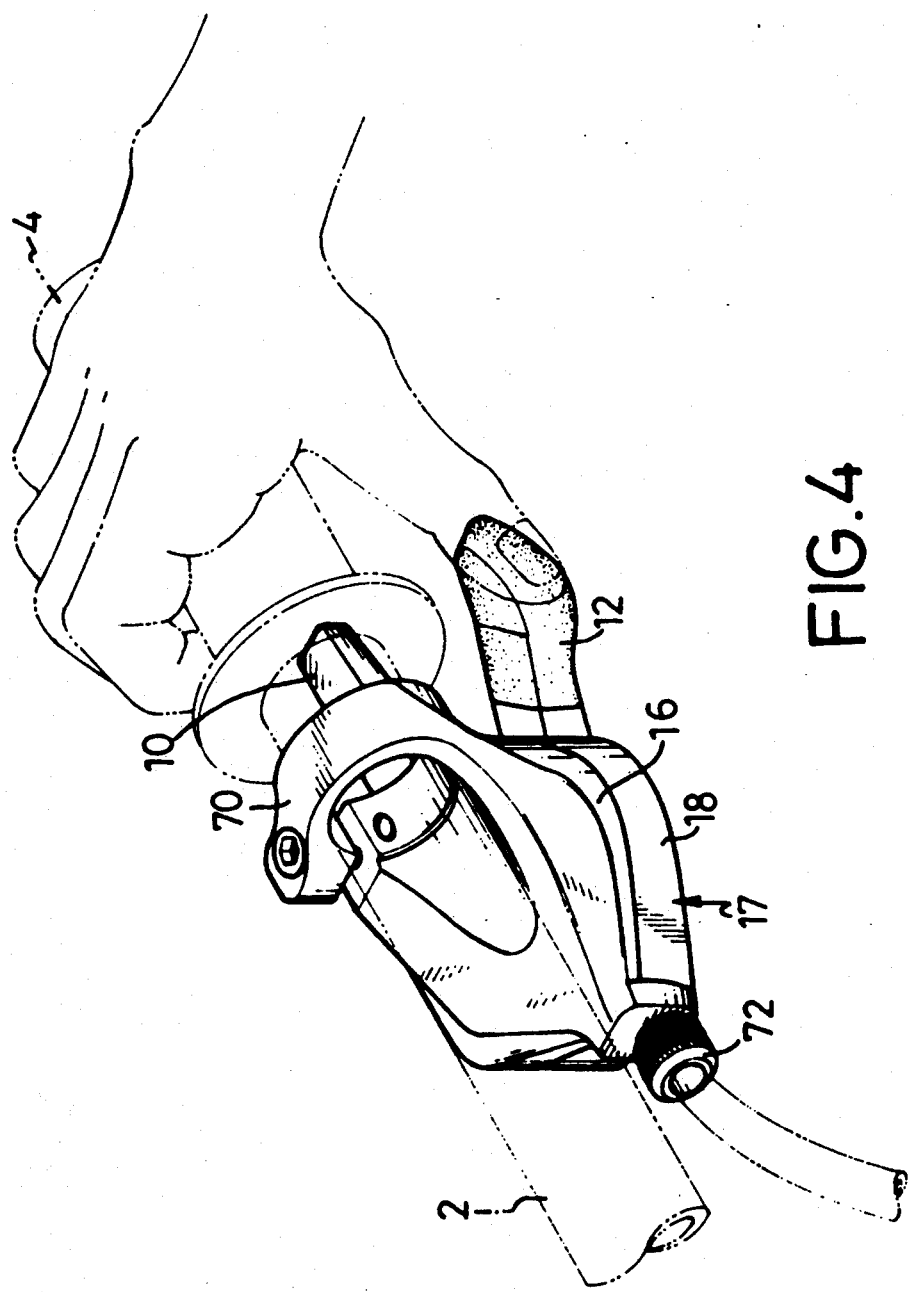
FIG. 4 is a perspective view of an indexed gear-shift mechanism in accordance with the present invention shown in a preferred embodiment mounted on a handlebar.

For down-shifting, the down-shifting lever 12 is drawn clockwise against the force of the second spring 56 by a force applied by a rider, as shown in FIG. 4, rotating the ratchet plate 14 therewith. The outer pawl 20 contacts a back side 622 of a previous adjacent tooth of the outer row of teeth 62 and is urged outward against the force of the first spring 32, rotating the up-shifting lever 10 clockwise, urging the gear-shift cable 74 outward, thereby placing the bicycle in a lower gear. When the outer pawl 20 clears the tooth, the first spring 32 urges the up-shifting lever 10 to rotate counterclockwise, striking the ratchet plate 14. The rider then releases the down-shifting lever 12, placing the outer pawl 20 on the front side 621 of the previous adjacent tooth of the outer row of teeth 62.

If desired, the rider may rotate the down-shifting lever 12 to the lowest gear in a single action, going from a high or the highest gear to the lowest gear quickly. The above-described down-shifting procedure is done in a rapid motion without the rider releasing the down-shifting lever 12 until the lowest gear is attained.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. An indexed gear-shift mechanism for a bicycle comprising:

(a) a housing comprising a base and a cover, said base being attached to handlebars of the bicycle, said cover being attached to said base, a cable port being formed in said housing for guiding a gear-shift cable having a block formed on an end thereof into and out of said housing;

(b) a ratchet plate defining an outer curvature and comprising a groove formed therein conforming to said curvature, an inner row of teeth projecting inward from said curvature into said groove, and an outer row of teeth projecting outward from said curvature, teeth of said inner row having a front side, teeth of said outer row having a front side and a backside; said ratchet plate having a through hole formed therethrough and defining an axis of rotation thereof;

(c) an up-shifting means for shifting said gear-shift mechanism to a higher gear comprising:

(i) an up-shifting lever having an internal portion, an external portion, and a through hole being formed and defining an axis of rotation therebetween, said external portion projecting through a first slot formed in said housing to an outside of said housing;

(ii) an inner pawl and an outer pawl protruding from said internal portion of said up-shifting lever and being spaced apart such that said outer pawl is positioned outside said groove and said inner pawl is positioned in said groove; and (iii) a first spring for urging said outer pawl of said up-shifting lever toward said ratchet plate to bear thereagainst;

said up-shifting means being pivotally attached to said base by fastening means utilizing said through hole of said up-shifting lever;

(d) a down-shifting means for shifting said gear-shift mechanism comprising:

(i) a down-shifting lever having an internal portion and an external portion, said internal portion being fixedly attached to said ratchet plate by fastening means and having a through hole formed therethrough, corresponding to that of said ratchet plate, and defining an axis of rotation of said down-shifting lever, said external portion projecting outside said housing through a second slot formed in said housing; and (ii) a second spring for urging said ratchet plate toward said cable port such that said front side of a tooth of said outer row bears against said outer pawl;

said down-shifting means being pivotally attached to said base by fastening means utilizing said through holes of said ratchet plate and said internal portion of said down-shifting lever; and (e) retaining means for retaining the block of the gear-shift cable being formed in at least one of said down-shifting lever and said ratchet plate;

whereby when an external force is applied on said external portion of said up-shifting; ever, said outer pawl is drawn off said front side of said tooth of said outer row and said inner pawl is drawn toward said curvature, said outer pawl clearing a vertex of said tooth, allowing said ratchet plate to rotate toward said cable port, urging the gear-shift cable out of said housing, said ratchet plate rotating until said front side of a tooth of said inner row is retained by said inner pawl; and when said external force is removed, said first spring rotates said up-shifting lever toward said ratchet plate, said inner pawl being drawn off said front side of said tooth of said inner row, said ratchet plate rotating until said front side of a next adjacent tooth of said outer row is retained by said outer pawl; and whereby when an external force is applied on said external portion of said down-shifting lever, said ratchet plate rotates away from said cable port, said backside of a tooth of said outer row being drawn toward said outer pawl, said backside of said tooth of said outer row contacting said outer pawl and urging said outer pawl outward, said outer pawl clearing a vertex of said tooth, said inner portion of said up-shifting lever rotating toward said ratchet plate, said outer pawl contacting said front side of said tooth of said outer row, said external force being removed or constantly applied.

2. An indexed gear-shifting mechanism as claimed in claim 1, wherein said outer pawl is defined as having a first surface and a second surface, and wherein said front sides and said backsides of teeth of said outer row and said curvature are arranged such that said front sides and said back sides respectively contact said first surface and said second surface of said outer pawl.

3. An indexed gear-shifting mechanism as claimed in claim 2, wherein teeth of said inner row are each defined as having a front side and said inner pawl is defined as having a first surface, and wherein said front sides of teeth of said inner row and said curvature are arranged such that said fronts sides of teeth of said inner row contact said first surface of said inner pawl.

4. An indexed gear-shifting mechanism as claimed in claim 1, said retaining means comprises:
(a) a shim plate being disposed between and fixedly secured to said internal portion of said down-shifting lever and said ratchet plate, said shim plate having a smaller radius of curvature than those of said internal portion of said down-shifting lever and said ratchet plate, and
(b) receiving spaces one each being formed in corresponding positions in said internal portion of said down-shifting lever, said ratchet plate, and said shim plate, whereby said receiving spaces receiving the block of the gear-shift cable, the gear-shift cable resting on an upper surface of said shim plate between said internal portion of said down-shifting lever and said ratchet plate.

5. An indexed gear-shifting mechanism as claimed in claim 1, wherein teeth of said inner row are each defined as having a front side and said inner pawl is defined as having a first surface, and wherein said front sides of teeth of said inner row and said curvature are arranged such that said fronts sides of teeth of said inner row contact said first surface of said inner pawl flush.

* * * * *